Patented Feb. 27, 1945

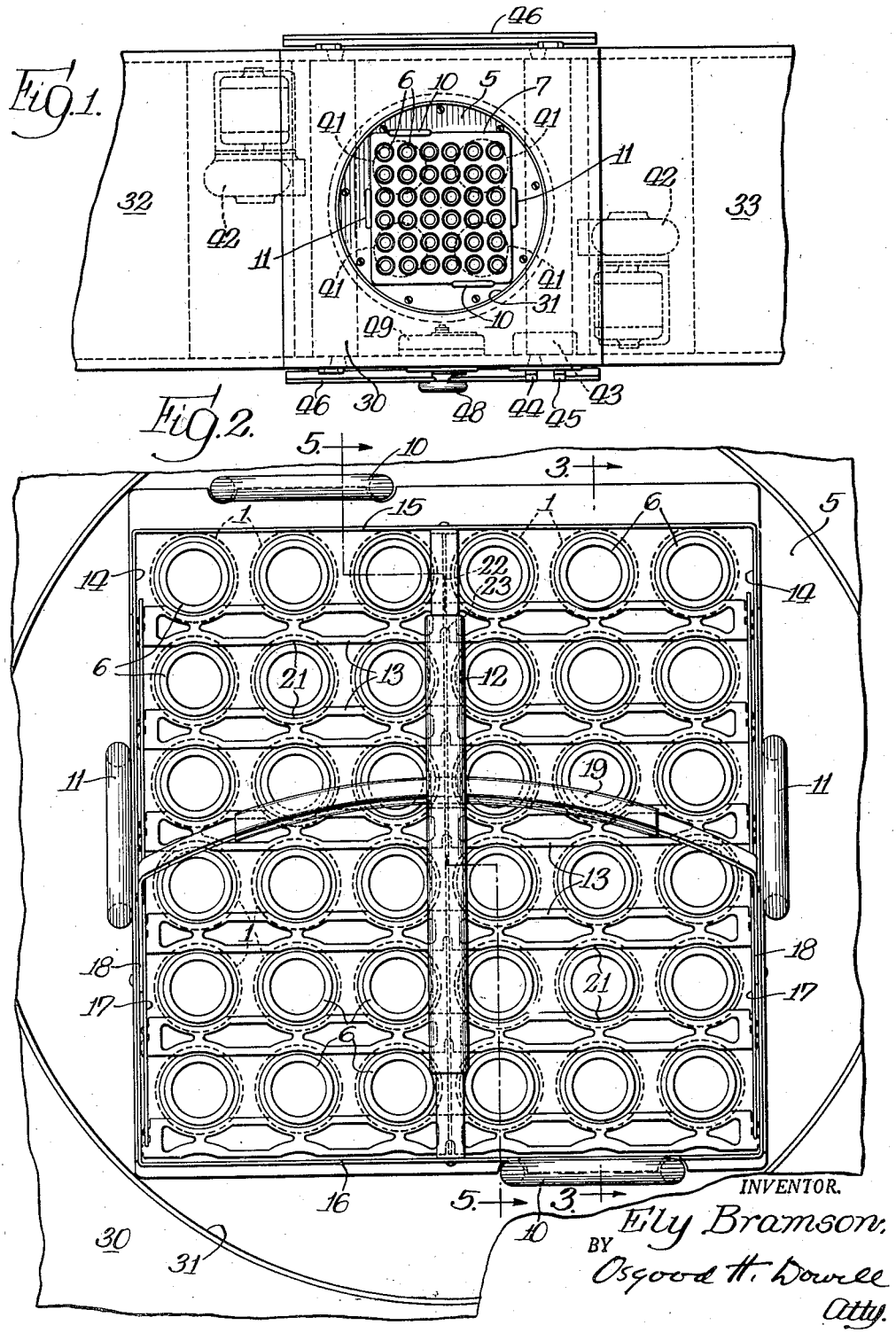

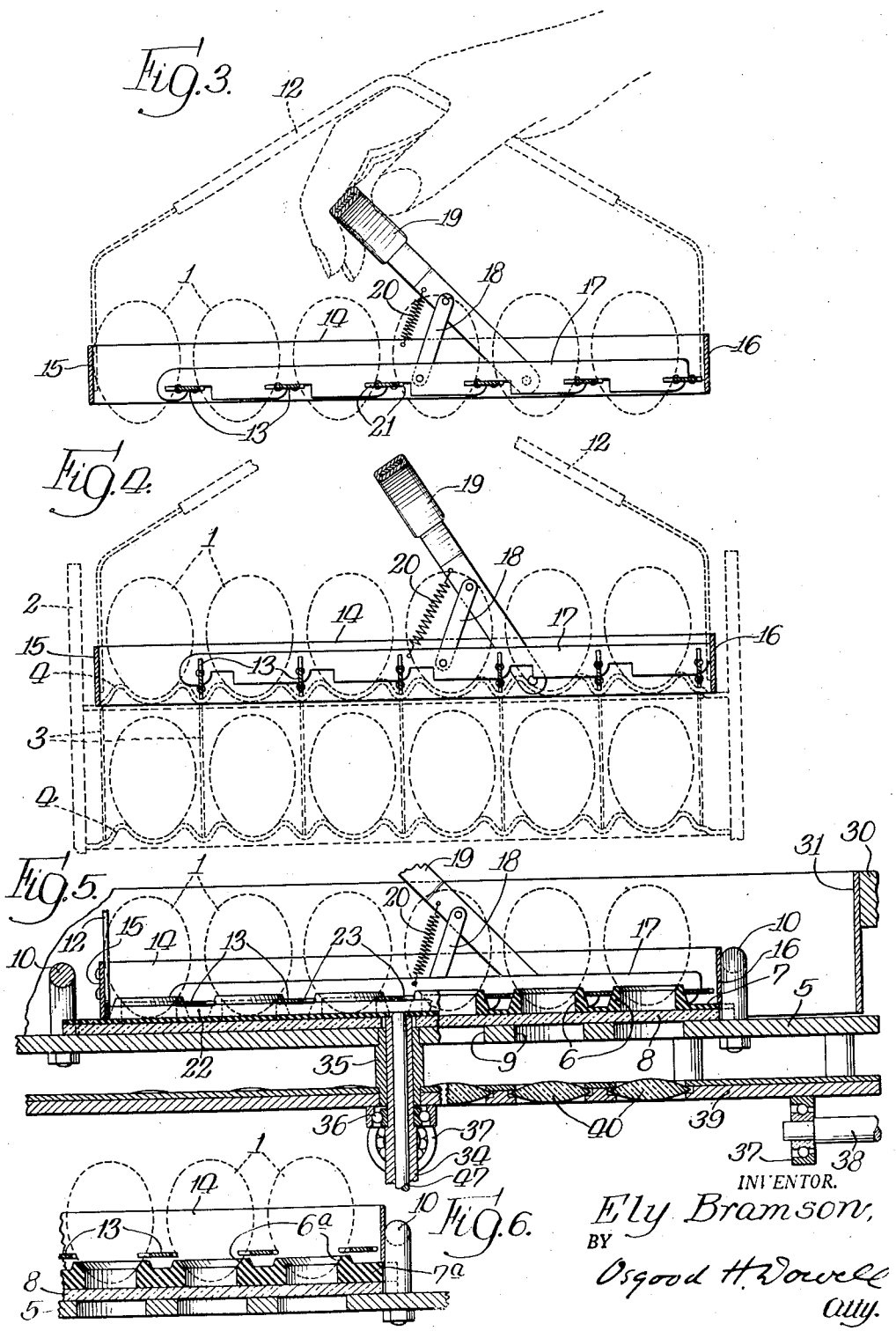

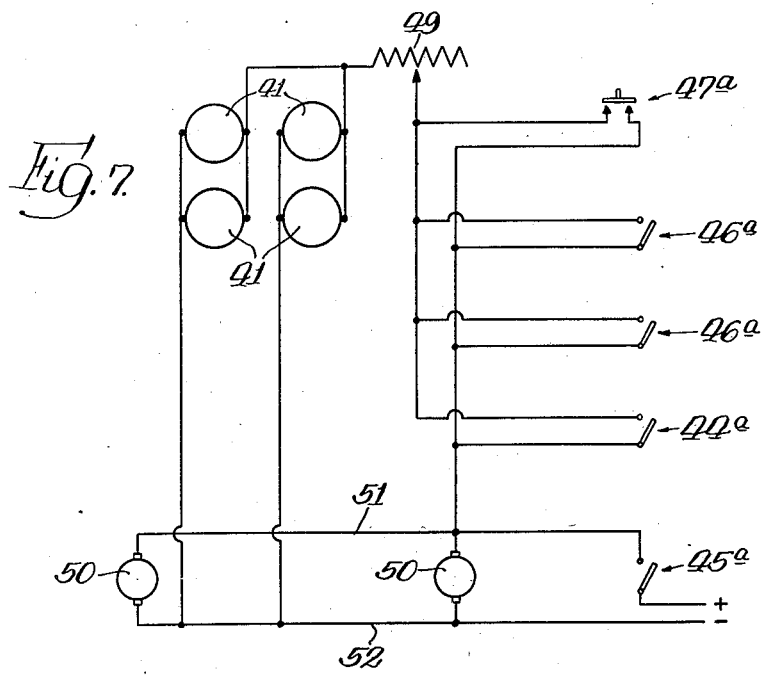

2,370,122

UNITED STATES PATENT OFFICE 2,370,122

EGG CANDLING APPARATUS

Ely Bramson, Chicago, Ill., assignor to The Bramson Manufacturing Co., Chicago, Ill., a corporation of Illinois Application December 16, 1942, Serial No. 469,208

8 Claims. (Cl. 88—14.6)

This invention, relating to the egg candling art, aims to provide simple means for expeditious candling of eggs in filler lots, and also to provide such means in a form of apparatus to permit and promote efficient candling.

More particularly, the invention has for its objects, first, the provision of an apparatus adapted to support for candling a filler lot of eggs and also adapted for use therewith of a transferring tray of the convenient type hereinafter indicated for transferring the eggs in filler lots from crates or shipping cases to correct position on the apparatus for candling, and for transferring the candled eggs from the apparatus to other crates or receptacles therefor; second, the provision of such apparatus in a form to permit the placing of the eggs thereon in correct position for candling with the use of the transferring tray from either side of the apparatus in a convenient manner; and, third, the provision of such apparatus in a form to facilitate the viewing of the eggs from their opposite sides and in various directions in the candling thereof and to permit the transferring tray to be conveniently placed in position when the support for the eggs is in either of two reversed positions.

The invention will be best understood by reference to an illustrative embodiment thereof shown in the accompanying drawings, wherein Fig. 1 is a top plan view of an egg candling apparatus embodying the invention in one practicable form.

Fig. 2 is a top plan view on a larger scale of the egg supporting portion of the apparatus with the transferring tray thereon, this view also indicating in dotted lines a filler lot of eggs supported on the apparatus in correct position for candling while retained in the transferring tray.

Fig. 3 is a cross sectional view of the transferring tray shown in operative position for supporting a filler lot of eggs indicated in dotted lines, the section being taken on the line 3—3 of Fig. 2.

Fig. 4 is a cross sectional view of the transferring tray shown about to pick up a filler lot of eggs from a crate compartment, the opposite walls of such compartment and two of the superposed layers of eggs therein, with the paperboard flats underlying and supporting the respective layers, and the paperboard filler associated with the lower one of the two layers shown, being all indicated in dotted lines.

Fig. 5 is a vertical cross sectional view of the illustrative apparatus and transferring tray thereon, the section being taken on the staggered line 5—5 of Fig. 2.

Fig. 6 is a sectional view corresponding to that of Fig. 5 but showing a slight modification.

Fig. 7 is a wiring diagram for electrical equipment of the illustrative apparatus.

Eggs are packed in crates or commercial shipping cases in superposed layers associated with paperboard fillers and paperboard flats separating and supporting the respective layers, these flats being commonly embossed to form raised cup-like seats on which the eggs stand on end. A lot of eggs comprising a layer in a crate compartment, or corresponding in number and arrangement to those of a layer in a crate compartment, is referred to herein as a filler lot. In the drawings, eggs of a filler lot or lots, shown in dotted lines, are designated by the reference numeral 1. In Fig. 4 there are represented in dotted lines opposite walls 2 of a crate compartment, two of the superposed layers of eggs therein, the paperboard filler 3 associated with the lower one of the two layers shown, said filler providing individual egg cells or compartments, and the embossed paperboard flats 4 underlying the respective layers.

Referring now to the illustrative egg candling apparatus, it comprises a support 5 adapted to support for candling a filler lot of eggs in substantially the same spaced relationship as in a layer in a crate compartment, said support having a set of cup-like or annular seats 6, corresponding in number and arrangement to the eggs of such a layer, on which the eggs can stand on end; there being openings through and centered in relation to said seats for passage of light from below them for illuminating the eggs for candling. In the form shown said support comprises a turntable having a rubber mat 7 superimposed on a glass plate 8 (Fig. 5) removably mounted on the turntable, said rubber mat being formed with raised circular bosses providing said seats 6 the openings in which are in registration with light apertures 9 in the turntable. Designed for the candling of such filler lots of eggs as are supplied in present standard egg crates, in the compartments of which every layer of three dozen eggs is arranged in a square of six rows of six eggs each, the illustrative apparatus has a like number and arrangement of its egg seats 6 and light apertures 9; it being understood, of course, that the invention is not intended to be limited by present standard practice as to the number and arrangement of eggs per layer in a crate compartment.

By means presently to be described, the candling apparatus is adapted for use therewith, for placing the eggs in correct position for candling upon and removing them from the apparatus, of a transferring tray of a type exemplified by the one shown in the drawings, which is a known device for use in egg handling plants for removing eggs by the filler lot from crates. This transferring tray, suspendible from the hand by a carrying handle 12 rigid with the tray frame, and shaped to fit within a standard crate compartment, has its bottom composed of a series of parallel thin flat bars 13 rotatably mounted in the opposite sides 14 of the tray frame. The other opposite frame sides 15 and 16 with which said bars are parallel will be referred to herein as the front and rear ends of the tray. Eccentrically of their end pintles the bars 13 are pivotally connected to a shifter bar 17 which is operatively connected by a link 18 to a bail type operating handle 19, the latter being pivotally connected to said opposite frame sides 14 and said link being pivotally connected to said shifter bar 17 and to the operating handle 19. By means of a retractile spring 20 the operating handle 19 is normally held at a forwardly inclined position, and in this position of said operating handle the parallel flat bars 13 are horizontally disposed and cooperate to support rows of eggs between them as shown in Fig. 3; the edges of said bars having uniformly spaced cutaway portions 21 to provide seats for the individual eggs, so that the tray supports the eggs with their lower ends protruding through and below the tray bottom. By retracting the operating handle 19 against the resistance of the spring 20, the bars 13 can be turned in a clockwise direction as viewed in Fig. 3 from their normal supporting positions shown in that figure to their release positions shown in Fig. 4, whereby to operate the transferring tray either to pick up a filler lot of eggs from a crate compartment or to deposit such a lot by releasing them through and from the bottom of the tray.

The tray shown has its carrying handle 12 arranged transversely of the operating handle 19, and has the tray frame sides 15 and 16 which have been referred to as its ends rigidly connected and braced by a vertically disposed flat cross bar 22; the rotatable bars 13 being formed with slots 23 to receive the upper edge of said cross bar 22 when said rotatable bars are turned on edge or to vertically disposed position.

Referring to Fig. 4, after a layer of eggs in a crate compartment has been uncovered and the filler associated therewith has been lifted out from the crate, the filler lot of eggs left standing on the embossed seats therefor on the underlying paper board flat 4 can be picked up as a lot and lifted from the crate by the transferring tray. In this operation the operator holds the tray by the carrying handle 12 while holding the operating handle 19 retracted, so that the parallel flat bars 13 stand on edge or vertically disposed. The tray with its bars 13 thus disposed is now let down in the crate compartment to a position upon the flat 4, the tray frame passing around the lot of eggs and the bars 13 passing between the rows of eggs. Then upon releasing the operating handle, the bars 13 will turn in a counterclockwise direction as viewed in Fig. 4 to horizontal position to pick up and support the eggs.

Characteristics of this transferring tray are (1) that it releasably holds the eggs with their under ends projecting below the tray bottom, and in a manner to release them through and from the tray bottom for depositing them; and (2) that while it holds the eggs in substantially the same spaced relationship as in the crate, it holds the lot as a whole slightly displaced relative to the tray frame. It will be observed that one row of eggs is supported by the front end 15 of the tray frame and the adjacent one of the bars 13, while each of the other rows is supported between a pair of such bars, thus spacing the rearmost row from the rear end 16 of the tray frame. Hence this tray could not be correctly positioned for positioning the eggs on a set of seats therefor by merely indiscriminately fitting the tray frame in guide means for engaging its four sides.

To adapt the egg candler for use with this transferring tray for positioning the eggs for candling, the support 5 has fixed thereon, in definite relation to the set of egg seats 6, a pair of parallel gauges 10 for engagement alternatively by the rear end 16 of the transferring tray, and a pair of parallel guides 11 at right angles to said gauges for engagement by the opposite sides 14 of the tray frame. The distance between said parallel gauges 10 or the vertical planes of their gauge surfaces, as measured in a line at right angles thereto, is greater than the length of the tray or the distance between its front and rear ends 15 and 16, in accordance with the displacement of the lot of eggs relative to the tray frame or the spacing of the rearmost row of eggs from said rear end 16 of the tray frame. The relation of each of said gauges 10 and the pair of parallel guides 11 to the set of egg seats 6 in such that by placing the transferring tray with its sides 14 fitted between said guides and its rear end 16 abutting against either of said gauges 10, the eggs in the tray are positioned directly over said seats.

As will be apparent from Figs. 5 and 6, the support 5 is adapted to support the eggs on said seats while the eggs are in the transferring tray, and to support the transferring tray while supporting the eggs on said seats. In the construction shown in Fig. 5 the transferring tray rests on said support with its bars 13 fitting between the rows of egg seats 6. In the slightly modified construction shown in Fig. 6, the support 5 supports the eggs on the seats 6ª of rubber mat 7ª while supporting the transferring tray with its bars 13 at a level above the tops of said seats and enclosing the lower portions of the eggs, thus affording lateral supports therefor.

It is desirable for best illuminating effects that the light from below support 5 should pass through but not around the eggs; hence for such best effects the eggs should stand on and be supported by the rubber egg seats 6; however it is within contemplation, in case anyone should prefer it, that the support 5 may be proportioned or constructed to hold the transferring tray so that when it rests in proper place on said support the eggs therein will be supported nearly or entirely by the transferring tray holding them over and preferably at least in contact or near contact with said seats 6.

Thus with the illustrative apparatus or other apparatus embodying the invention, transferring trays such as described or having the operating characteristics hereinbefore indicated can be used for transferring eggs in filler lots to correct position for candling on the apparatus, for retaining the eggs during candling, for supporting or partially supporting the eggs during candling if desired, and for transferring the eggs after candling from the apparatus and depositing them in filler pockets in other crates or elsewhere as desired.

In the use of the transferring tray shown, the operator usually finds it most convenient to hold it as indicated in the drawings, with the tray frame side 15 which has been referred to as its front end in a foremost position or away from him. By providing for positioning the tray on the candling apparatus by means of parallel guides and a gauge for engagement by the rear end of the tray located at or toward the side of the apparatus, the operation of positioning the tray in proper relation to the egg seats of the candler is very convenient for the operator. By providing the two gauges 10 at opposite sides of the set of egg seats 6, the transferring tray can be placed in position conveniently from either side of the apparatus. By arranging the two guides 11 directly opposite each other, and the two gauges 10 unsymmetrically or in relatively offset instead of confronting positions, the gauges are readily distinguishable from the guides, which is especially advantageous where, as in this case, the support 5 is a turntable with relation to the center of which the set of egg seats 6, gauges 10 and guides 11 may assume various different positions.

By providing said support 5 with its fixtures as a turntable rotatable about a vertical axis in centered relation to the set of egg seats on said support, the eggs can be viewed from opposite sides and different directions in candling, and the transferring tray can be positioned conveniently from either side of the apparatus, or by either of two operators working at opposite sides of the apparatus, or when the turntable is in either of two reverse positions. The gauges 10 and guides 11 may also serve as handles by which to rotate the turntable, and for holding in proper relation thereto the glass plate 8 and rubber mat 7 removably mounted thereon.

Except as to the subject-matter set forth in the foregoing part of this specification, the illustrative apparatus is the same as that disclosed in my pending application Ser. No. 456,596 filed August 28, 1942.

In the drawings, 30 designates a housing co-operating with the turntable to provide a light chamber thereunder, the turntable being mounted adjacent to and substantially or nearly closing a circular opening 31 in the top of said housing, the wall of which opening is overlapped by the peripheral portion of the turntable as indicated by dotted lines in Fig. 1. In the specific construction shown, the cylindrical wall of the opening 31 is of such depth as to provide the vertical wall of a shallow well the bottom of which is formed by the top side of the turntable which supports the eggs for candling within said well. The depth of the well in relation to the height of the eggs as they stand on their seats on the turntable is preferably about as shown in Fig. 5, with the advantage that when the eggs are in place for candling no transverse shadows from lights external of the apparatus will be cast.

The housing 30 is embodied in a cabinet-like stand having at opposite ends of the housing a pair of low tables 32 and 33 one of which may serve as a receiving table for crates from which filler lots of eggs are to be transferred by the transferring tray to the apparatus for candling, and the other of which may support crates or receptacles into which the candled eggs or those found satisfactory by the candling test are to be transferred by the transferring tray from the apparatus.

As shown in Fig. 5, the turntable is rotatably mounted on a vertical center post 34 suitably supported in fixed position within the housing, the hub 35 of the turntable being fitted over the upper end of said center post and mounted thereon through the medium of an antifriction step bearing 36. The peripheral portion of the turntable is shown supported on anti-frictionally mounted rollers 37 carried by radially disposed supporting rods 38.

The turntable is shown constructed with a rigidly affixed lower member 39 having light apertures equipped with light condensing lenses 40 in registration with the light apertures and egg seats of the upper member of the turntable. It will be understood that the members 5 and 39 of the turntable are of suitable opaque material and that no light can pass up through or around the turntable to the well except through the light apertures of the turntable.

Indicated by dotted lines in Fig. 1 are a group of electric lamps 41, preferably of the flood type, arranged within the housing under the turntable for casting light up through the lenses and light apertures thereof for illumination of the eggs for candling. Also indicated by dotted lines in Fig. 1 are electrically operated blowers 42 arranged for intake of room air and for blowing the air upon the lamps and through the light chamber to carry off heat generated by the lamps.

There is also indicated by dotted lines in Fig. 1 a switch box 43 which contains two snap type switches actuated respectively by the finger levers 44 and 45, one for controlling the lighting circuit and the other for controlling the circuit of the motors 50 for operating the air blowers. Preferably the lighting circuit is arranged as a branch from the motor circuit, so that the light cannot be turned on except when the motor circuit is closed, insuring operation of the blowers whenever the lamps are lit.

Longitudinally of the cabinet at opposite sides of the housing 31 are a pair of members 46 for actuating a pair of switches by either of which the lighting circuit can be closed. Said members may be hinged boards pendent from their hinged edges and normally spring pressed outwardly, these being arranged at a convenient elevation to be pressed inwardly by the knee of the operator, so that the light can be turned on easily from either side of the apparatus or independently by either of two operators working at opposite sides of the apparatus.

The lighting circuit can also be closed automatically by the placing of the transferring tray in proper position on the turntable, by means of a normally spring-lifted vertical rod 47 slidably fitted in the hollow center post 34 and depressible by the weight of said tray. When the transferring tray is placed on the turntable in proper position for the candling of the eggs, its cross bar 22 bears on the upper end of said rod 47, depressing it for actuation of a switch to close the lighting circuit.

In Fig. 1 there is shown the dialing knob 48 of a dial type rheostat 49 included in the lighting circuit for regulating the intensity of the light, as is desirable to avoid illumination of the eggs by too intense light, which would render them less satisfactorily examinable than under less intense illumination, and to permit the operator to vary the light intensity to suit the particular batch of eggs being candled and to obtain the light best suited to his individual eyesight.

As represented in the wiring diagram in Fig. 7, the circuit of the electric motors 50 for operating the air blowers is controlled by the hand switch 45ª (actuated by 45 in Fig. 1); and the lamps 41, shown arranged in two parallel groups and in circuit with the variable resistance of the rheostat 49, are connectable across the lines of the motor circuit by any of the various other switches shown; 44ª being the manually operated lamp switch (actuated by 44 in Fig. 1); 46ª, 46ª the lamp switches operable by the knee boards 46; and 47ª the lamp switch which is automatically operated by depression of the rod 47 (Fig. 5) by the weight of the transferring tray. Each of the switches 44ª, 46ª, 46ª and 47ª has one pole connected to the motor circuit conductor 51 and its other pole connected to the adjustable terminal of the rheostat 49 whose other terminal is connected to wires leading to the lamps from which other wires lead to the motor circuit conductor 52. Thus when the motor circuit is closed, the lamp circuit can be closed either by the automatically operated switch 47ª, or by either of the knee operated switches 46ª, or by the hand switch 44ª.

In the subjoined claims, "a transferring tray of the type described" is intended to mean not necessarily the specific tray shown herein for illustration but one by which the eggs of a filler lot can be lifted as a lot out from a crate compartment and which is operable to pick up and to release the eggs through the tray bottom and supports the eggs with their lower ends projecting below the tray bottom and in substantially the same spaced relationship as in the crate but with the lot as a whole displaced relative to the tray toward a side or end thereof. The front end of the transferring tray, in the sense of this specification, is the tray side intended to be the front in the ordinary use of the tray or which is away from the operator as he holds the tray in front of him and over a layer of eggs in a crate compartment for picking up such layer or over the candler for positioning the eggs thereon. The term "crate" is intended to include any shipping or packing box or crate in which eggs are packed as hereinbefore indicated.

The illustrative apparatus embodies an invention described and claimed in my said copending application Serial No. 456,506, the present application being limited to subject-matter not specifically disclosed in said copending application.

I claim as my invention:

1. Egg candling apparatus comprising, in combination, a support having a set of light apertures corresponding in number and arrangement to the eggs of a filler lot in a crate, a transferring tray by which such a lot can be lifted out from a crate and transferred to and from position for candling, said transferring tray being operable to pick up and to release the eggs through the tray bottom and adapted to support them with their lower ends projecting below the tray bottom and in substantially the same spaced relationship as in the crate but with the lot as a whole displaced relative to the tray toward a side thereof, said support being adapted to support said transferring tray with the eggs therein over said apertures, and means in definite relation to said set of apertures comprising a pair of parallel guides for coaction with opposite sides of the tray and a gauge at right angles to said guides for coaction with the intermediate tray side opposite that toward which the lot of eggs is displaced relative to the tray, the relation of said gauge and pair of guides to said set of apertures being such that the placing of said transferring tray upon said support between said guides and with said intermediate tray side against said gauge positions the eggs for candling over said apertures.

2. Apparatus according to claim 1 wherein said transferring tray is adapted to be held by the operator in front of him with said intermediate tray side as the rear end of the tray or toward the operator and wherein said gauge and parallel guides are arranged for presentation of said gauge adjacent to and longitudinally of the side of the candling support at which the operator works, with said parallel guides extending transversely and forwardly with respect to said rear tray end or at the side of said gauge toward the opposite side of said support from that at which the operator works.

3. Egg candling apparatus comprising, in combination, a support having a set of light apertures corresponding in number and arrangement to the eggs of a filler lot in a crate, a transferring tray by which such a lot can be lifted out from a crate and transferred to and from position for candling, said transferring tray being operable to pick up and to release the eggs through the tray bottom and adapted to support them with their lower ends projecting below the tray bottom and in substantially the same spaced relationship as in the crate but with the lot as a whole displaced relative to the tray toward one end thereof, said support being adapted to support said transferring tray with the eggs therein positioned for candling over said apertures, and means in definite relation to said set of apertures comprising a pair of parallel gauges for engagement alternatively by the tray end opposite that toward which the lot of eggs is held displaced relative to the tray and a pair of parallel guides at right angles to said gauges for coaction with the opposite tray sides, the distance between said gauges as measured in a line at right angles thereto being greater than the distance between the tray ends, and the relation of each of said gauges and pair of parallel guides to said set of apertures being such that the placing of said transferring tray upon said support between said guides and with its first mentioned tray end against either of said gauges positions the eggs therein for candling over said apertures.

4. An egg candler adapted for candling eggs by the filler lot and adapted for use with a transferring tray of the type described for transferring such lots to and from position for candling, comprising a support on which to rest said tray having a set of egg seats corresponding in number and arrangement to the eggs of such a lot in a crate and at such a level as to directly support the eggs while in the transferring tray and while the tray rests directly on said support, there being apertures in said support through said seats for passage of light from a source below for illuminating the eggs for candling, said support having thereon a pair of parallel gauges for engagement alternatively by the tray end opposite that toward which the lot of eggs is held displaced relative to the tray and a pair of parallel guides at right angles to said gauges for coaction with the opposite tray sides, said gauges being parallel with and slightly spaced equidistantly from opposite sides of a square area having its other opposite sides contiguous to said guides and having said set of seats in centered position therein and square therewith, and the relation of each of said gauges and pair of parallel guides to said set of seats being such that the placing of said transferring tray upon said support between said guides with its first mentioned end against either of said gauges will position the eggs therein on said seats.

5. An egg candler adapted for candling a filler lot of eggs while in a transferring tray of the type described, comprising a support on which to rest said tray having parallel guides between which to fit the tray and a pair of parallel gauges arranged between the planes of and at right angles to said guides, said support having between said gauges and between said guides a set of light apertures corresponding in number and arrangement to the eggs of such a lot as they stand in the crate, said gauges being parallel with and slightly spaced equidistantly from opposite sides of a square area having its other opposite sides contiguous to said guides and having said set of apertures in centered position therein and square therewith, and the relation of each of such gauges and pair of parallel guides to said set of apertures being such that the placing of said tray upon said support between said guides with the tray side opposite that toward which the tray holds the lot of eggs displaced in engagement with either of said gauges positions the eggs therein for candling over said apertures.

6. An egg candler according to claim 5 wherein said gauges and guides are arranged for presentation of said gauges respectively adjacent to and longitudinally of the opposite working sides of the candling support, with said guides extending transversely of said working sides and between the planes of said gauges.

7. An egg candler according to claim 5 wherein said pairs of gauges and guides are arranged with the elements of one pair symmetrically disposed relative to said set of apertures and those of the other pair unsymmetrically disposed, whereby said gauges are readily distinguishable from said guides.

8. An egg candler according to claim 5 wherein said support comprises a turntable mounted for rotation about a vertical axis to permit changing and reversing the position of the illuminated eggs relative to the observer, said pairs of gauges and guides permitting convenient positioning of the transferring tray when the support is in either of two reversed positions, the gauges being readily visually distinguishable from the guides.

ELY BRAMSON.